(12) United States Patent
Trotter et al.

(10) Patent No.: US 10,232,289 B2
(45) Date of Patent: Mar. 19, 2019

(54) FILTER COUPLING

(71) Applicant: ILLINOIS TOOL WORKS INC., Glenview, IL (US)

(72) Inventors: Jason K. Trotter, Des Plaines, IL (US); Dennis M. Mark, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 6 days.

(21) Appl. No.: 15/310,470

(22) PCT Filed: May 1, 2015

(86) PCT No.: PCT/US2015/028947
§ 371 (c)(1),
(2) Date: Nov. 11, 2016

(87) PCT Pub. No.: WO2015/179110
PCT Pub. Date: Nov. 26, 2015

(65) Prior Publication Data
US 2017/0072341 A1    Mar. 16, 2017

Related U.S. Application Data

(60) Provisional application No. 62/000,085, filed on May 19, 2014.

(51) Int. Cl.
*B01D 29/01* (2006.01)
*B01D 39/10* (2006.01)
*B01D 35/02* (2006.01)

(52) U.S. Cl.
CPC ......... *B01D 29/014* (2013.01); *B01D 29/012* (2013.01); *B01D 35/02* (2013.01); *B01D 39/10* (2013.01)

(58) Field of Classification Search
CPC .... B01D 29/014; B01D 39/10; B01D 29/012; B01D 35/02
(Continued)

(56) References Cited

U.S. PATENT DOCUMENTS 2,798,613 A * 7/1957 Tinker .................. B01D 35/02
210/446
3,228,665 A    1/1966 Dolan
(Continued)

FOREIGN PATENT DOCUMENTS

CN      103083970      5/2013
CN      203108323      8/2013
(Continued)

OTHER PUBLICATIONS

ISR and WO for PCT/US2015/028947 dated Sep. 21, 2015.

*Primary Examiner* — Madeline Gonzalez
(74) *Attorney, Agent, or Firm* — Joseph M. Butscher; The Small Patent Law Group, LLC

(57) ABSTRACT

A coupling filter for a fluid system comprising a molded hollow tubular body having a wall defining a flow passage, a porous filter element of generally parabolic cross-sectional shape with a base portion extending across the entire flow passage and a pair of wing portions extending longitudinally of the flow passage and converging toward the base portion. In one form the base portion is cylindrical and in another form it is "W" shaped with a series of flat mesh panels presented to the flow path.

11 Claims, 4 Drawing Sheets

(58) Field of Classification Search
USPC .................................. 210/446, 439, 449, 451
See application file for complete search history.

(56) References Cited

U.S. PATENT DOCUMENTS

| | | | | |
|---|---|---|---|---|
| 5,202,020 | A * | 4/1993 | Desjoyaux | B01D 29/27 |
| | | | | 210/416.2 |
| 6,994,787 | B1 * | 2/2006 | Stamey, Jr. | B01D 29/13 |
| | | | | 210/232 |
| 7,694,942 | B1 * | 4/2010 | Genera | B01D 35/02 |
| | | | | 210/151 |
| 2005/0072725 | A1 * | 4/2005 | Swanson | B01D 27/02 |
| | | | | 210/289 |
| 2005/0087481 | A1 * | 4/2005 | Boast | B01D 35/0273 |
| | | | | 210/130 |
| 2005/0145551 | A1 * | 7/2005 | Ballet | B01D 29/117 |
| | | | | 210/175 |
| 2013/0334127 | A1 * | 12/2013 | Perz | B01D 29/014 |
| | | | | 210/447 |
| 2014/0158608 | A1 | 6/2014 | Pranger et al. | |

FOREIGN PATENT DOCUMENTS

| | | |
|---|---|---|
| CN | 203591640 | 5/2014 |
| WO | 2013016199 A1 | 1/2013 |

* cited by examiner

FILTER COUPLING

CROSS-REFERENCE TO RELATED APPLICATION

This application is a National Phase of International Application No. PCT/US2015/028947, filed May 1, 2015, and claims the benefit pursuant to Title 35 USC § 119(e) to Provisional Application No. 62/000,085, filed May 19, 2014, the entire content of which is hereby incorporated by reference as if fully set forth herein.

BACKGROUND OF THE INVENTION

This disclosure relates to tubular filtration apparatus for fluid systems. More particularly, it relates to such apparatus having the length of a coupling element with a filter element in the fluid flow path.

PCT Patent Publication WO 2013/016199 entitled "Filter Assembly for Fluid System," published Jan. 31, 2013, discloses a coupling filter for a fluid line that includes a body forming a fluid passageway with a screen mesh filter media disposed obliquely relative to the fluid flow path. The entire content of the specification and drawings of that application is incorporated by reference herein as if fully set forth herein.

Gas or liquid fluid systems commonly include a filtration apparatus to separate contaminants from the flowing medium. In some applications, the device takes the form of a fluid coupling interposed between adjacent sections of tubular conduit connected to it in fluid tight relation. The coupling includes a filter element to filter the fluid flowing within the system.

Systems involving such filtration apparatus include automotive fuel and vapor lines, automotive air conditioning systems including refrigerant flow paths, power steering systems and most recently, temperature control systems for hybrid battery installations. They are also extant in many other disciplines including medical treatment, commercial or residential refrigeration systems, as well as other fluid systems.

The filter assembly illustrated in the above identified PCT application presents specific advantages over fluid line filter couplings previously employed. It provides filtration capacity in a reduced axial profile and minimizes clogging and consequent flow restriction.

SUMMARY OF THE DISCLOSURE

The present development disclosed herein represents an enhancement in both areas. That is, the filter coupling of the present disclosure provides a further reduction in axial profile for the same filtration capacity, and further reduces clogging tendencies.

The filter media is a screen mesh folded about a transverse line to form two wings that converge toward a downstream cylindrical base. It thus defines a parabolic shape, reducing overall axial length by nearly one half for the same filter capacity. Moreover, as compared to the oblique filter screen, it eliminates the tendency for debris collection between the filter screen and the flow passage wall at the downstream end of the filter media.

Like its immediate predecessor, the coupling filter of the present disclosure is a molded tubular body made of polymeric material with the filter media overmolded in place across the flow path defined by the body. By virtue of this configuration of the filter media, its positioning and retention within a mold cavity for the overmolding process is simplified and manufacturing reliability improved.

DESCRIPTION OF THE DRAWINGS

Referring now to the drawings, the filter assembly or filter coupling of the present disclosure is illustrated in three separate figures in which.

DETAILED DESCRIPTION OF ILLUSTRATED EMBODIMENTS

Figure 1:
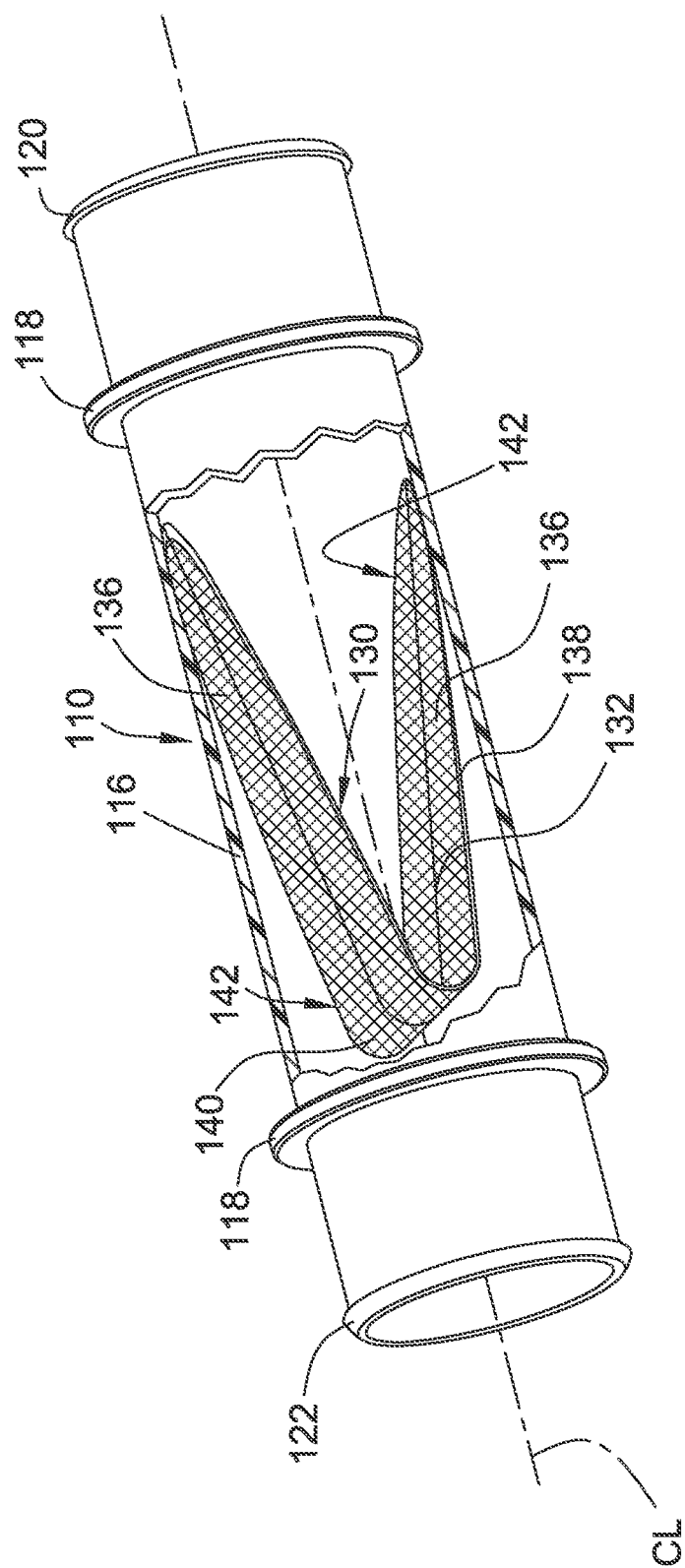
FIG. 1 is a perspective view partially in section illustrating the filter assembly body with the filter media positioned in the flow path.
Figure 2:
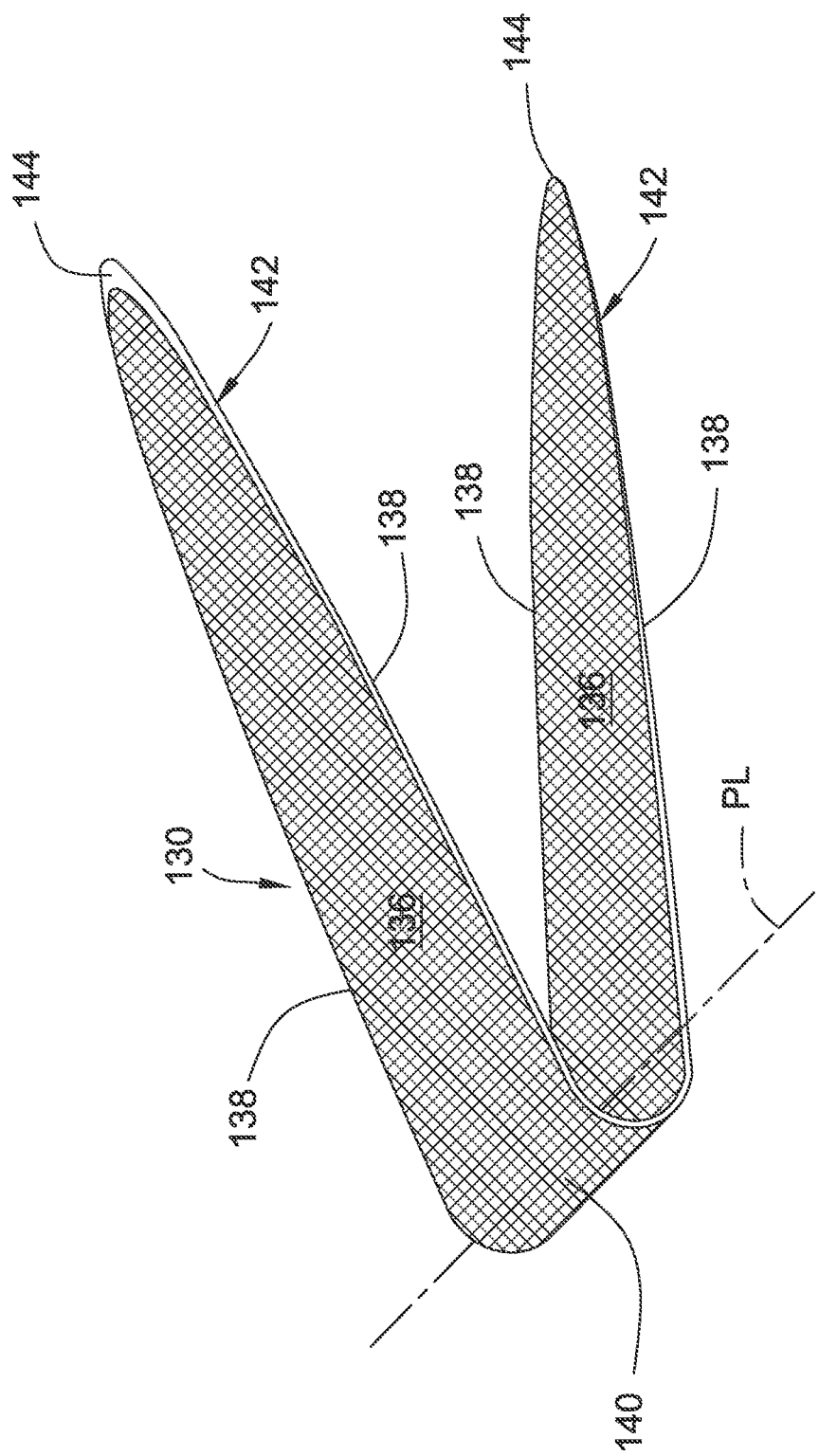
FIG. 2 is a perspective view of the mesh filter media element of the filter coupling of FIG. 1.
Figure 3:
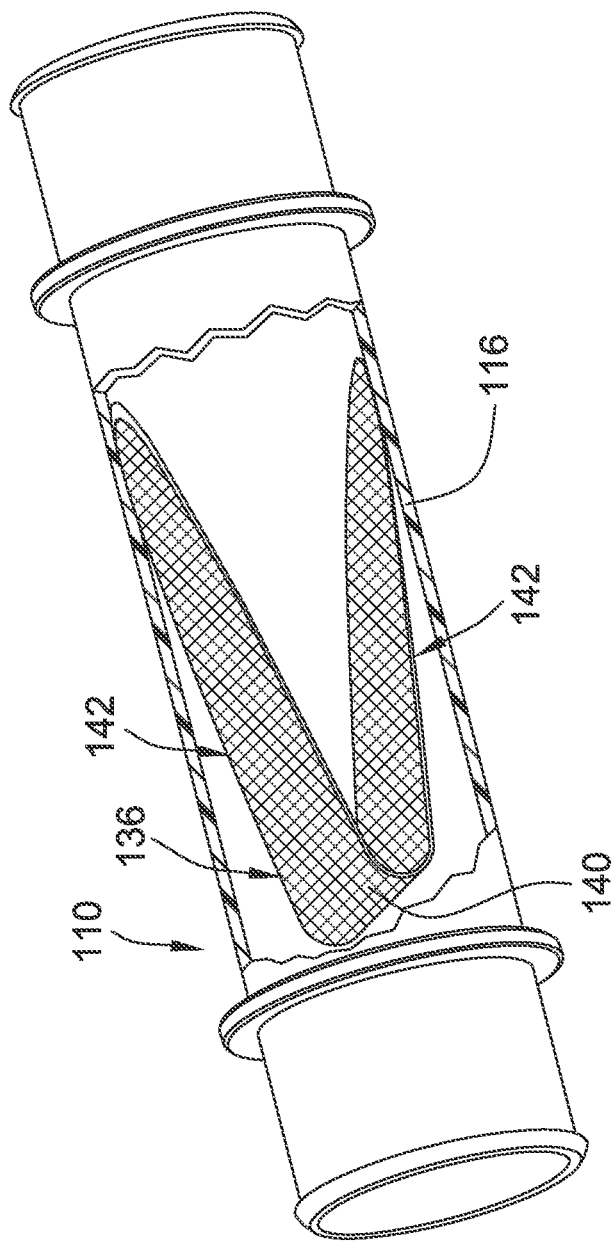
FIG. 3 is a perspective view, partially in section, illustrating various modifications contemplated for the filter coupling of the present disclosure.

Turning now to the drawings, a coupling filter illustrative of the principles of the present disclosure is seen in FIGS. 1 to 3. Coupling filter or filter assembly 110 is a component of a fluid system inserted between adjacent ends of hollow tubular fluid conduits such a flexible hose or tubing. As seen in FIG. 1, coupling filter or filter assembly 110 includes a tubular body 116 with a wall defining a flow passage of circular cross section along a longitudinal centerline CL. Filter element 130 is integrated into the wall of the body 116 within the fluid flow passage by overmolding during molding of the wall of the body 116.

As illustrated, hollow cylindrical tubular body 116 includes exterior spaced radial stops 118 to limit insertion within an associated tube or hose. It also includes external barbs 120 and 122 at opposite ends of body 116 that coact with the interior surface of the tube or hose for a fluid tight relationship. The coupling filter body 116 is a molded plastic component made from a suitable polymeric material such as acetel.

As can be appreciated, coupling filter 110 is readily installed into a fluid system by insertion between adjacent spaced ends of aligned fluid conduits. The tubular body of the coupling filter 130 is received within the inner tubular surface of the flow conduits. The radial stops 118 establish the insertion limit into each conduit. The barbs 120 and 122 radially expand the tubular flow conduits, usually flexible hose or tubing, to provide a fluid tight relationship. All fluid flow through the tubes 112 and 114 passes through, and is filtered by, the filter mesh media 136.

Alternatively, the cylindrical tubular body 116 need not include the exterior radial stops 118 or barbs 120 or 122 at its opposite ends. In this form, the cylindrical body 116 may conveniently be inserted into a flow passage defined by a tubular member to provide the filtering function.

Filter element 130, best seen in FIG. 2 comprises a formed stainless steel mesh media component 136 with peripheral edge 138. The media could, of course, include a skeletal frame as disclosed in the PCT Publication WO 2013/016199. The filter media would include a peripheral edge embedded into the cylindrical tubular body 116 during the molding process. Moreover, the filter media may be formed of a non-metallic material such as a polymer, for example, nylon (PA-66) or other suitable material.

The shape of the filter element 130 is best seen in FIG. 2. It has a generally "V" or "U" shape in the direction of fluid flow. It has a generally parabolic cross sectional shape with a cylindrical downstream base portion 140 and wing portions 142 that converge in the direction of flow toward the base portion. The cylindrical shaped base portion 140 extends across the entire flow passage or channel at the downstream end of the filter element 130. Base portion 140 is cylindrical about a centerline PL (illustrated in FIG. 2) perpendicular to a plane passing through the longitudinal centerline CL of the body 116 of filter assembly 110 (FIG. 1). The cylindrical shape of the end portion of the filter element 130 is disposed centrally of the fluid flow path. Moreover, it disposes a substantial portion of the filter media perpendicular to the flow path, minimizing flow restriction and maximizing filtration effectiveness. The peripheral edge 138 of the filter mesh is embedded in the polymeric molded wall of body 116. Therefore the edge shape is an elongated arc that follows the intersection of the cylindrical wall defining the body 116 and the screen mesh exposed within the flow channel.

The shape of filter element 130 thus provides the same, or increased filter capacity as the obliquely oriented screen of the coupling filter described in the above identified PCT publication within half the longitudinal length of the body 116. Moreover, the cylindrical base portion 140 avoids the tendency to collect debris in a convergent pocket as is the case of the intersection of the downstream edge of an obliquely oriented filter media and the flow passage wall.

The mesh size or open mesh area of filter media 136 may be chosen based on the expected particle size of the contaminants being filtered. The total open area is then established by the length of the filter element 130 along the flow axis of the tubular body 116 and the size and shape of the filter media 136.

It is contemplated that the filter assembly body 116 is molded in a mold which is pre-loaded with a filter element 130. If the filter element 130 is a stainless steel mesh, it is first shaped and then inserted into a mold for forming the body 116. On molding of the body, the peripheral edge 138 is integrated into the body 116. Therefore all flowing fluid necessarily passes through the filter element. The parabolic "V" or "U" shape of filter element 130 is convenient to such molding since the tips 144 of the screen mesh wing portions 142 can be readily held in place with a mold core pin during mold closure.

FIG. 3 illustrates various modifications available to conform the filtration capacity to the particular fluid system into which the filter assembly 110 is incorporated. For example, the angle of convergence of wing portions 142 can be varied to increase or decrease the overall longitudinal (axial) length of the filter media 136. Also, the base portion 140 semi-cylindrical shape as illustrated may be varied in the size of its forming radius from a maximum filling, most of the cross-sectional area of the flow passage, to a sharp "V" shaped minimal radius.

Figure 5:
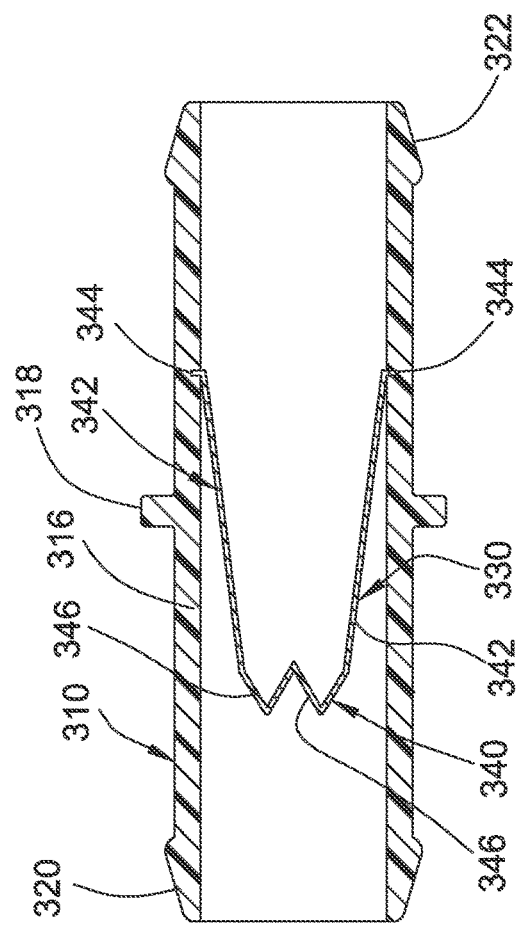
FIG. 5 is a side sectional view of the filter coupling of FIG. 4 taken along the line 5-5 of FIG. 4.
Figure 4:
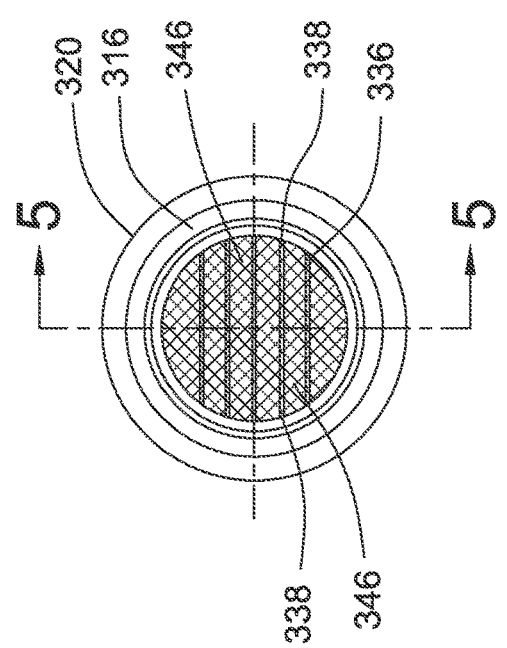
FIG. 4 is an end view of a filter coupling illustrating a modified form of filter element.

The semi-cylindrical shape of base 140 could also be modified to, for example, a "W" cross-section forming a series of flat accordion mesh panels presented to the flow path. Such an option is illustrated in the filter coupling shown in FIGS. 4 and 5. FIG. 4 illustrates a filter assembly or filter coupling 310 having a hollow tubular body 316 defining a flow path. It includes barbs 320 and 322 at each end to form a fluid tight seal with attached lines of a fluid system such as or tubes. A central radial stop 318 limits insertion of the body 316 into an associated hollow tube or hose.

A filter element 330 made of stainless steel mesh is positioned across the fluid flow path, it includes a downstream base portion 340 and wing portions 342 that converge toward the base portion. Peripheral edges of the mesh media 338 are embedded in the polymeric body 316 as illustrated at tips 344 to integrate the body 316 and filter element 330. The base portion includes accordion like folds 346 to present a series of flat mesh panels to the flow path.

With the coupling filter of the present disclosure, the body axial length of coupling filter 110 body 116 has the same axial extent as a coupling to connect two adjacent flow conduits. A filter coupling as herein disclosed can readily be incorporated into an existing fluid system. It is essentially a "drop-in" filter replacement with enhanced ability for filtration and easy connection. It is easily adapted to any filter coupling application within a fluid conduit comprising hollow tubular construction.

The life expectancy of any filter is adversely affected by the accumulation of the particulate matter that is being filtered from the system. With the filter element of the present disclosure a substantial portion of the filter media is positioned perpendicular to the fluid flow path maximizing filtration efficiency.

The shape of the filter element 130 provides for flexibility in sizing the filter element 130 relative to the length of the coupling body 116 to ensure adequate filtration capacity for a given application. The increase in area of the filter media can also ultimately mean that smaller and consequently less expensive components can be utilized to fulfill system requirements.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A coupling filter for a fluid system comprising:
   a wall defining a hollow tubular body along a longitudinal centerline defining a flow passage between its ends, wherein said wall of said body is formed of molded polymeric material;
   a porous filter element disposed between said ends of said body and integrated into said body, wherein said porous filter element includes an outer peripheral edge secured in fluid tight relation within the wall of said body, wherein said peripheral edge of said porous filter element is embedded in said molded polymeric material;
   wherein said porous filter element has a parabolic cross-sectional shape including a base portion extending across said entire flow passage and a pair of wing portions extending therefrom.

2. A coupling filter as claimed in claim 1 wherein said wing portions converge in the direction of flow from said wall of said body defining said flow passage to said base portion.

3. A coupling filter as claimed in claim 2 wherein said wing portions converge in the direction of flow from said wall of said body defining said flow passage to said base portion.

4. A coupling filter as claimed in claim 2 wherein said base portion is generally cylindrical in shape about a centerline perpendicular to a plane passing through the longitudinal centerline of said body and extends across the entire flow passage.

5. A coupling filter as claimed in claim 3 wherein said base portion is generally cylindrical in shape about a centerline perpendicular to a plane passing through the longitudinal centerline of said body and extends across the entire flow passage.

6. A coupling filter as claimed in claim 1, said body defines a coupling having an exterior barb at each end.

7. A coupling filter as claimed in claim 6 wherein said body defines an exterior abutment spaced between said barbs at said ends.

8. A coupling filter as claimed in claim 3 wherein said porous filter element comprises a stainless steel mesh.

9. A coupling filter as claimed in claim 8 wherein said stainless steel mesh is insert molded into said wall of said body.

10. A coupling filter as claimed in claim 1 wherein said wing portions converge toward said base portion.

11. A coupling filter as claimed in claim 2 wherein said wing portions converge toward said base portion.

* * * * *